United States Patent [19]

Katzakian, Jr. et al.

[11] 3,939,071

[45] Feb. 17, 1976

[54] RECOVERABLE REGENERANTS FOR CATIONIC EXCHANGE RESINS

[75] Inventors: Arthur Katzakian, Jr., Sacramento; David O. DePree, Loomis, both of Calif.

[73] Assignee: Aerojet-General Corporation, El Monte, Calif.

[22] Filed: Aug. 12, 1974

[21] Appl. No.: 496,482

[52] U.S. Cl. .................................................. 210/34
[51] Int. Cl.² ......................................... B01D 15/06
[58] Field of Search ......... 210/24, 26, 29, 30, 31 R, 210/32, 34

[56] References Cited
UNITED STATES PATENTS

| | | | |
|---|---|---|---|
| 2,694,681 | 11/1954 | Bray et al. | 210/31 R |
| 2,776,258 | 1/1957 | Gilliland | 210/34 |
| 3,062,739 | 11/1962 | Crits | 210/24 |
| 3,414,507 | 12/1968 | Calmon | 210/32 |
| 3,663,163 | 5/1972 | DePree et al. | 210/32 |
| 3,700,592 | 10/1972 | DePree | 210/34 |

Primary Examiner—Charles N. Hart
Assistant Examiner—Ivars Cintins
Attorney, Agent, or Firm—Edward O. Ansell

[57] ABSTRACT

An improved, closed-cycle process for regeneration of weakly acidic spent cation resins and for the recovery and recycle of the regenerants is disclosed. The improvement resides in the use of hydroxy or alkoxy substituted carboxylic acids as the cation resin regenerant. These acids and their metal salts are soluble and are high boiling and do not form azeotropes. When the spent cation regenerant is combined with the spent anion regenerant such as an amine salt, a weak, dissociable complex of the regenerants is formed and the metal salt is reconstituted. The complex is dissociated, preferably by distillation, into the separate regenerants which are recycled and the salt is recovered.

15 Claims, 1 Drawing Figure

RECOVERABLE REGENERANTS FOR CATIONIC EXCHANGE RESINS

BACKGROUND OF THE INVENTION

1. Field of the Invention

The present invention relates to the removal of mineral pollutants from water, and more particularly, to an improved method for recovery of spent regenerants and removal of mineral salts therefrom.

2. Description of the Prior Art

Deionization processes employing weak acid and weak base resins are per se known to the art. Two very real advantages in using these weak resins are the achievement of very high regeneration efficiencies and a high theoretical loading capacity. Both types of weak exchangers can easily and effectively be regenerated to high levels by employing amounts of regenerant only slightly in excess of stoichiometry.

An improved process for the removal of mineral pollutants from water utilizing weakly acidic cation resin and weakly basic anion resin is disclosed in U.S. Pat. No. 3,700,592. The cation resin is regenerated with a chelating agent while the anion resin is regenerated with an organic solution of a base. The spent cation regenerant as a metal chelate is treated with carbon dioxide to precipitate a metal carbonate and free the chelate regenerant for recycle. The metal carbonate is then combined with the spent anion regenerant (amine salt) at elevated temperatures to precipitate the metal salt and recover carbon dioxide and amine regenerant for recycle.

An improved recovery process which eliminates separate treatment of the spent regenerant before reconstituting the mineral salt is disclosed in a copending application Ser. No. 496,619, filed concurrently herewith, entitled "Solid Mineral and Regenerant Recovery for Ion-Exchange Resins". In the improved process, a basic spent cation regenerant is combined with an acidic spent anion regenerant to form a weak dissociable complex of the regenerants and to reconstitute the mineral salts. The spent cation and anion regenerants are combined either in a continuous or batch fashion by blending near stoichiometric quantities of the materials. This stoichiometric adjustment is based on the amount of the two streams necessary to reconstitute the mineral salts removed from the spent ion-exchange resins. The regenerant streams may be either aqueous solutions or organic solvent water-solutions.

Among the cation resin regenerants disclosed in the aforementioned copending applications are metal complexing agents such as β-diketone chelating agents such as 1,3-cyclohexanedione. Although these chelating agents are extremely effective regenerants, they suffer to some extent from loss through dimerization at elevated temperature under alkaline conditions such as encountered during the distillation recovery of the amine regenerant. Substitution with sterically hindering groups such as aliphatic groups in the 5- or 2-position of cyclohexanedione prohibits the dimerization reaction. However, such substitution decreases the water solubility of the chelate and the resulting metal chelate.

SUMMARY OF THE INVENTION

The preferred recoverable carboxylic acid cation resin regenerants are hydroxy or alkoxy substituted alkanoic acids of the formula:

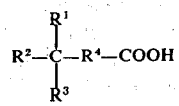

where $R^1$, $R^2$ and $R^3$ may be any of $-H$, $-OH$, $-(CH_2)_nCH_3$, $-O(CH_2)_n-CH_2R^5$, $-O[(CH_2)_qO]_m CH_2R^5$ where $n$ is an integer from 0 to 5, $m$ is an integer from 1 to 3, $q$ is an integer from 1 to 3 and $R^5$ is $-H$ or $-OH$; provided at least one of $R^1$, $R^2$ and $R^3$ contain at least one $-C-O-C-$ or $-C-OH$ moiety. $R^4$ is a divalent aliphatic hydrocarbon bridge containing 0–4 carbon atoms.

The hydroxyl or alkoxyl substituents provide high solubility for the parent acid and its cationic salts, particularly of such alkaline earth metal ions as calcium and magnesium. These substituents also insure that the acid is high boiling and demonstrates non-azeotropic behavior for ease of separation from the anion regenerant such as a tertiary amine. The weak complexing ability of these acids can be a positive factor in enhancing cation removal.

A basic spent cation regenerant is combined with an acidic spent anion regenerant to form a weak dissociable complex of the regenerants and to reconstitute the mineral salt. The spent cation and anion regenerants are combined either in a continuous or batch fashion by blending near stoichiometric quantities of the materials. This stoichiometric adjustment is based on the amount of the two streams necessary to reconsititute the mineral salts to be removed from the ion-exchange resins. The regenerant streams may be either aqueous solutions or organic solvent water-solutions. In either case, the regenerant streams are diluted by the amount of water of solvation released by the resin during regeneration and possibly by washes of the resin beds. This additional water is removed prior, during or after separation of the regenerants depending on the nature of the separation technique employed and the best time for precipitation and removal of the salts. The regenerants are recovered in their free-base forms, i.e., non-salt forms which for the cation regenerant is the acid form and for the anion regenerant is the hydroxyl form.

Separation and recovery of the free-base forms * of the regenerants may be accomplished by a physical separation technique such as one of the following:
1. distillation of a more volatile regenerant from a relatively non-volatile regenerant;
2. solvent extraction using an immiscible solvent having preferential solubility for one of the regenerants; or
3. by forming an insoluble complex of one of the regenerants.

\* Cation Regenerant - Non-salt, i.e., acid form of the acid.
Anion Regenerant - Hydroxy Form, i.e., non-salt form.

The recovered regenerants are adjusted in concentration and recycled to regenerate the spent anion and cation resins and the precipitated mineral salts are separated by filtration, sedimentation or centrifugation.

The instant process minimizes expenditures for chemicals by recycling all reagents required in the process and by otherwise limiting reagent losses. The process is with minimum modifications adaptable to the treatment of a wide variety of mineral containing streams and particularly to brackish water and tertiary waste streams from sewage plants. A further advantage of the instant process is that it is compatible with state of the art regeneration techniques.

The unique and flexible system of the invention will cleanse source water in unlimited quantity and will eliminate brine disposal if used in conjunction with specialized regeneration techniques now available. The instant systems can reduce the mineral content of the irrigation waters to prevent the loss of soil productivity and remove nitrates, phosphates and other ions which can foster algae growth. The systems can aid in the recovery of valuable minerals from manufacturing waste water, provide economical methods for tertiary treatment of waste water and have broad application in brackish water conversion. It can thus open up vast new sources of water that without economical proper treatment would be unusable or unfit for general use. Since these systems provide economies in waste water tertiary treatment to remove dissolved, inorganic solids, they make possible the recycling of this water supply or reinjection of the treated water into ground reservoirs without lowering the overall quantity.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
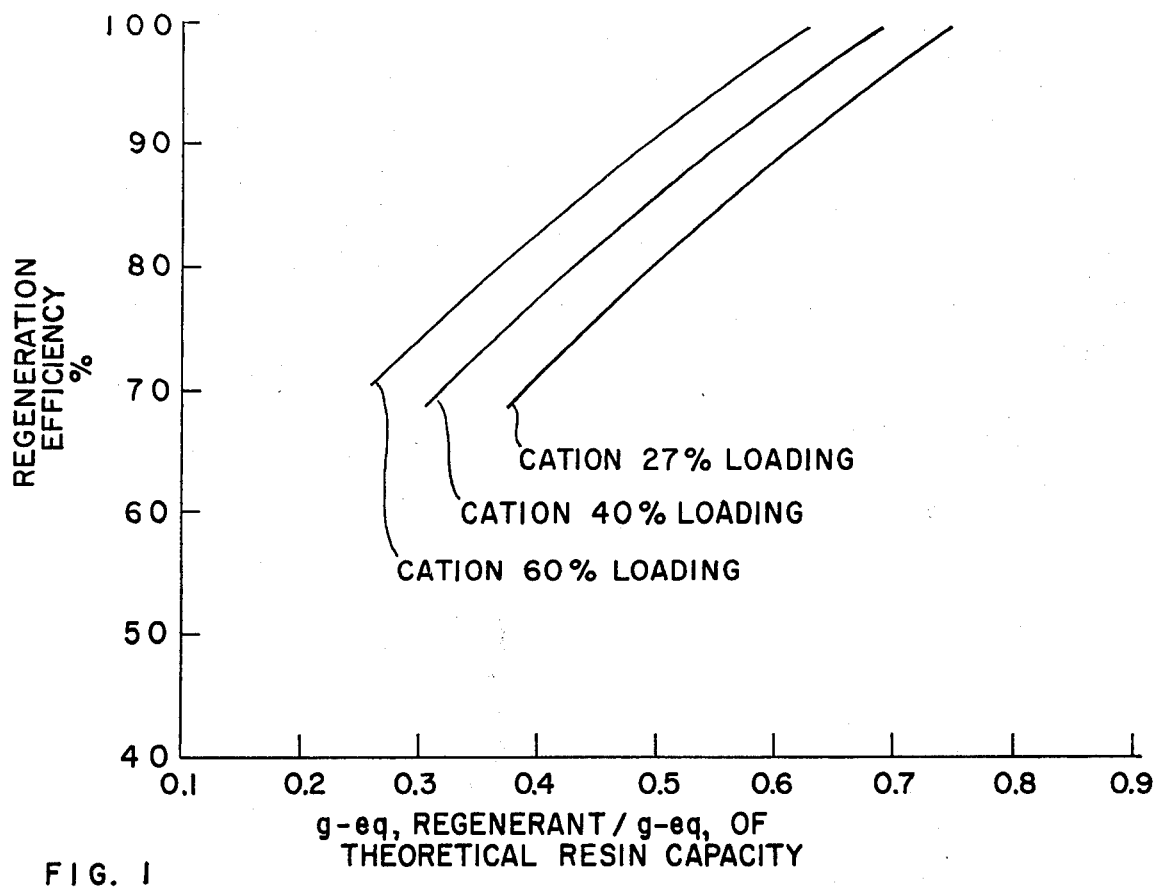
FIG. 1 is a graph illustrating the regeneration efficiency at 25°C of a N-methyl morpholine buffered CC-3 resin column with MOPA at different Na+ loading levels.

The process of the invention is preferably utilized in the purification of aqueous streams by the use of weak or moderately strong cation exchange and anion exchange resins. The resin beds may be mixed as disclosed in U.S. Pat. No. 3,700,592 or may be separate as disclosed in copending application Ser. No. 476,835 filed June 6, 1974.

The separation technique to be employed depends on the specific ion-exchange resins, the regenerants used to regenerate the resins and the particular salts which are to be precipitated.

The high degree of efficiency required of the process for it to be economical requires that not only the resin regenerations be essentially quantitative but that the separation and recovery of the regenerants be highly efficient. To achieve this separation it is necessary that the complex formed between the cation regenerant and the anion regenerant be sufficiently dissociated to provide enough of the anion regenerant for its rapid removal by distillation, complexation or solvent extraction. This separation becomes progressively more difficult as the acid concentration in the pot increases due to amine removal. Four requirements must thus be met by the regenerants: (1) the pK of the cation and anion regenerants must be low enough to assure quantitative regeneration of the respective ion-exchange resins, (2) the pK of these regenerants must be high enough to provide adequate dissociation of their complex to permit ease of separation, (3) the anion regenerant heel remaining in the cation regenerant after separation must not interfere with the regeneration of the cation resin or remain deposited on this resin after regeneration and (4) the cation regenerant must be stable to the separation media and must be stable under the conditions of the separation step. The pK of the regenerant will generally be between 5 and 7. Regeneration efficiency is related to the type of ion-exchange resins to be regenerated and the primary process of demineralization. The regenerant recovery process of the invention is generally adaptable to spent regenerant streams from separate or mixed beds of buffered or unbuffered weakly acidic cation exchange resins and weakly basic anion exchange resins such as those disclosed in U.S. Pat. No. 3,700,592 and in U.S. patent application Ser. No. 476,835, filed June 6, 1974.

The process is applicable to removal of water soluble inorganic salts from water, mainly halides, sulphates, sulphites, phosphates, phosphites, carbonates, bicarbonates, nitrites and nitrates of such metals as K, Na, Ca, Ba, Mg, Sn, Fe, Cu, Zn, Al, V, cr, Mn and others. Excellent results are obtained with the Group IA and IIA alkali and alkaline earth metals, the most naturally occurring impurities, since these are difficult to remove by non-buffered processes. The process in both embodiments will also work on saline feeds containing mixtures of anions and/or cations.

The pK of the resins, both cationic and anionic should fall between about 5 and about 7. The resins are used in particulate bead form and may be large beads in the size range of 20–50 mesh or larger or small beads in the range of 40–80 mesh or smaller.

The weak cation-exchange resins which are particularly useful in the practice of this invention are those which contain carboxylic acid groups. These resins can conveniently be otbained by the copolymerization of compounds such as acrylic acid, methacrylic acid, acrylic esters, methacrylic esters, acrylonitrile or methacrylonitrile, and other unsaturated acrylates or nitriles with appropriate cross-linking agents such as divinylbenzene. If the resins are formed, however, from the polymerization of compounds containing ester or nitrile groups, hydrolysis to the corresponding acid must be effected prior to buffer addition. Further illustrations of the resins useful in the practice of the present invention and of methods for their preparation may be found by reference to U.S. Pat. Nos. 2,340,111; 2,371,818; 2,597,437; 2,885,371 and 2,963,453. In addition to the above-mentioned ion-exchange resins, other weak-acid resins may be used. These resins may include those containing phosphonous, phosphonic, phosphinic or phosphoric acid groups and those resins which are made from phenol-formaldehyde condensates which also contain carboxylic acid groupings. The ion-exchange resins preferred at this time are those which contain either acrylic or methacrylic acid functional groups.

Representative weak-acid resins are Amberlite IRC-50 (a carboxylic resin based on a methacrylic acid cross-linked copolymer) having a pK of 6.1, B10-Rex 63 (a moderately acidic, phosphonic acid polystyrene type) of Biorad Corporation, Chelex-100 (a very weekly acidic, iminodiacetic acid polystyrene type), and Duolite CC-3 (a polyacrylic acid having a pK of 5.57) of Diamond Shamrock Corp. Duolite CC-3 is favored due to high loading.

Weak "base" ion-exchange resins are generally resins having primary amine, secondary amine or tertiary amine as the principal functional group. Typically the weak base polyamines are copolymers of acrylonitrile and methyl acrylate cross-linked with divinylbenzene and then subjected to aminolysis with polyamines; copolymers of styrene-divinylbenzene chloromethylates treated with primary or secondary amines; and reaction products of phenolformaldehyde with a polyalkyleneamine. A weakly basic anion exchange resin may be defined as one which on titration with hydrochloric acid in water free from electrolytes has a pH below 7 when the amount of hydrochloric acid added is one-half the amount required to reach the inflection point (equivalence point). Representative resins are set forth in the table below:

Table 1

| Anionic Resins | Composition | pK |
|---|---|---|
| ES-340 (Diamond Shamrock) | 85% Amine Functionality, 15% Quaternary, Amine/Epoxy Polymer Matrix, Gel Type | 6.49 |
| Dowex FDS-4024L (Dow Chemical) | Benzyl Dimethyl Amine Active Groups, Macroporous | 6.81 |
| Amberlite IRA-68 (Rhom & Haas) | Tertiary Amine Active Groups, Crosslinked Acrylic Matrix, Gel Type | 5.82 |
| Amberlite IRA-94 (Rhom & Haas) | Amine Functional Groups Styrene-Divinylbenzene Matrix, Macroporous | 6.77 |

Even though ES-340 and FDS-4024L have similar basicities, the former is preferred due to its capability of achieving rapid equilibration during deionization and loading in the range of 25–30%.

The regeneration process proceeds through the following steps:

I Cation Resin Regeneration

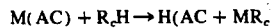

M(AC) + $R_cH \rightarrow H(AC) + MR_c$

II Anion Resin Regeneration

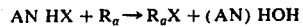

AN HX + $R_a \rightarrow R_aX$ + (AN) HOH

III Combination

$MR_c + R_aX \rightarrow MX + R_cR_a \rightarrow MX + R_c + R_a$ where:
H(AC) = Cation Resin, H Form
MX = Inorganic salt; M=cation, X = anion
AN(HOH) = Anion Resin, OH Form
MAC = Metal cation loaded cation resin
AN HX = Anion loaded anion resin
$R_c$ = Cation regenerant
$R_a$ = Anion regenerant
$R_cR_a$ = Dissociable complex In steps I and II, the spent resins are regenerated to displace the metal cation M and anion X to essentially quantitatively regenerate the resins to the acid and base forms yielding a metal salt $MR_c$ of the cation regenerant and a salt $R_aX$ of the anion regenerant. In step III the two salts in essentially stoichiometric amounts are combined to reconstitute the removed salt MX and to form the dissociable complex of the regenerants $R_cR_a$.

The anion regenerant according to the invention is an organic base. Among the organic bases, the amines (substituted and unsubstituted) are particularly suitable herein as anion regenerants. These amines may be selected from compounds of the formula:

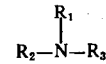

$$R_2-\underset{\underset{R_3}{|}}{\overset{\overset{R_1}{|}}{N}}$$

Where $R_1$, $R_2$ and $R_3$ are selected from hydrogen, alkyl, alkynyl, alkenyl, aryl, alkaryl, aralkyl, alkoxy and may be substituted with hetero atoms or groups such as hydroxyl, ether, halogen, cyano; or $R_2$ and $R_3$ may be linked to form a cycloaliphatic structure. The molecular weight of the amine is preferably maintained below about 500 and preferably below 200 to avoid extensive swelling and deterioration of the resin particles. Preferred anion regenerants have a pK in water at 25°C of 5 to 7. The pK of the regenerant is a compromise between the ability to regenerate and the ability to separate the regenerants. As the basicity decreases, the ability to regenerate decreases but the separation from the cation regenerant is facilitated.

Representative amine anion regenerants are N,N-dimethylethylamine, trimethylamine (TMA), pyridine, N-methylmorpholine, N,N-dimethyl-2-methoxyethyl amine, isopropanol amine, tri-n-octyl amine, tri-n-decyl amine, N,N-diethylmethyl amine, triethylamine and the like. Higher pK organic bases such as trimethylamine provide better separation from the cation regenerant. The regenerant should be at least two magnitude in pK more basic than the anion resin for efficient regeneration.

The anion regenerant is generally provided in at least a 30% stoichiometric excess with respect to the anion loading level of the column, generally a 50 to 200% excess. Regeneration need not proceed to completion but may be 60% or more depending on requirements of the primary demineralization step. The regenerant steam may be water or organic solvent based such as an alcohol, suitably methanol. The water content must be at least 5%, preferably at least 10%, to allow efficient removal of anions while preventing collapse of the resin due to dehydration.

Specific cation resin regenerants are α-hydroxy alkanoic acids of from 2–6 carbon atom chain length, β-hydroxy alkanoic acids of from 2–6 carbon atom chain length and the methyl, ethyl and propyl ethers of the above acids. Representative acids are α-lactic acid, β-lactic acid, β-methoxypropionic acid (MOPA) and 4,7-dioxacaprylic acid (DOCA).

The regeneration efficiency of several of these acids is illustrated by results of laboratory scale regeneration of both sodium and calcium loaded resins representing both the polyacrylic (Duolite CC-3) and polymethacrylic (Amberlite IRC-84) types using both water and methanol/water solutions as shown in the following table.

TABLE 2

| | REGENERATION OF CATION EXCHANGE RESINS WITH HYDROXYL OR ALKOXYL SUBSTITUTED CARBOXYLIC ACIDS. | | | | | |
|---|---|---|---|---|---|---|
| Regenerant | Conc. N | Excess % Over Theory | Solvent | Cation | Resin | Regen. % |
| α- Lactic Acid | 1.98 | 20 | $H_2O$ | $Na^+$ | Duolite CC3 | 94 |
| " | 1.39 | 100 | 15%$CH_3OH$/85%-$H_2O$ | $Na^+$ | Duolite CC3 | 90 |
| " | 1.46 | 100 | 15%$CH_3OH$/85%- | $Ca^{++}$ | Duolite CC3 | 94 |

TABLE 2-continued
REGENERATION OF CATION EXCHANGE RESINS WITH HYDROXYL OR ALKOXYL SUBSTITUTED CARBOXYLIC ACIDS.

| Regenerant | Conc. N | Excess % Over Theory | Solvent | Cation | Resin | Regen. % |
|---|---|---|---|---|---|---|
| β- Lactic Acid | 2.0N | 50 | $H_2O$ | $Ca^{++}$ | Amberlite IRC-84 | 84.5 |
| " | 1.03N | 100 | $H_2O$ | $Ca^{++}$ | Duolite CC3 | 96.2 |
| β-Methoxy Propionic Acid | 2.0N | 50 | $H_2O$ | $Na^+$ | Duolite CC3 | 100 |

The cation regenerant is preferably utilized in excess in order to achieve efficient regeneration. The excess is suitably at least 50% of the amount theoretically required and preferably at least 100% of the stoichiometric amount. Furthermore, these cation regenerants are capable of efficient regeneration even in the presence of anion regenerant residues and salt heels. In fact, as shown in the following table, relatively high concentrations of these residues have little effect on regeneration efficiency.

TABLE 3
EFFECT OF SALT AND AMINE REGENERANT HEELS ON REGENERATION EFFICIENCY OF HYDROXYL AND ALKOXYL SUBSTITUTED CARBOXYLIC ACIDS

| Cation Regenerant | Amine Heel, % of Cation Regenerant | Salt Heel % | Cation | Excess Cation Regenerant % | Regeneration % |
|---|---|---|---|---|---|
| α- Lactic Acid | Trimethyl Amine 12.5 | 0 | $Na^+$ | 50 | 91.9 |
| " | Trimethyl Amine 22.0 | 0 | $Na^+$ | 50 | 98.4 |
| " | Trimethyl Amine 24.5 | 0 | $Ca^{++}$ | 50 | 88.9 |
| " | Trimethyl Amine 32.3 | 0 | $Na^+$ | 50 | 97.6 |
| " | Trimethyl Amine 31.0 | 0 | $Ca^{++}$ | 50 | 85.0 |
| β- Lactic Acid | Trimethyl Amine 22.0 | 0 | $Na^+$ | 50 | 93.6 |
| " | Trimethyl Amine 20.2 | 7.7% NaCl | $Na^+$ | 50 | 87.7 |

The effect of loading level on the regeneration efficiency of both MOPA and DOCA in regenerating Duolite CC-3 cation exchange resin (a polyacrylic acid resin) loaded with various alkali and alkaline earth metal ions is shown in the following table. The loading level is the loading achieved by passing salt solution through a buffered column as in the demineralization step.

| CATION | REGENERANT, | N | LOADING LEVEL, % | REGENERATION ACHIEVED, % | EQUIVALENTS ON REGENERANT USED |
|---|---|---|---|---|---|
| Na | DOCA | 1.0N | 70 | 95 | 1.35 |
| Ca | MOPA | 1.0N | 38 | 66 | 1.91 |
| Ca | DOCA | 1.0N | 57 | 85 | 2.38 |
| Ca | MOPA | 1.0N | 70 | 94 | 2.62 |
| Mg | DOCA | 1.0N | 70 | 78 | 2.05 |
| Mg | MOPA | 1.0N | 44 | 98 | 3.20 |
| Ba | DOCA | 1.0N | 60 | 67 | 3.60 |
| Ba | MOPA | 1.0N | 54 | 67 | 3.85 |
| Sr | DOCA | 1.0N | 54 | 80 | 2.93 |
| Sr | MOPA | 1.0N | 66 | 90 | 3.15 |

Figure 2:
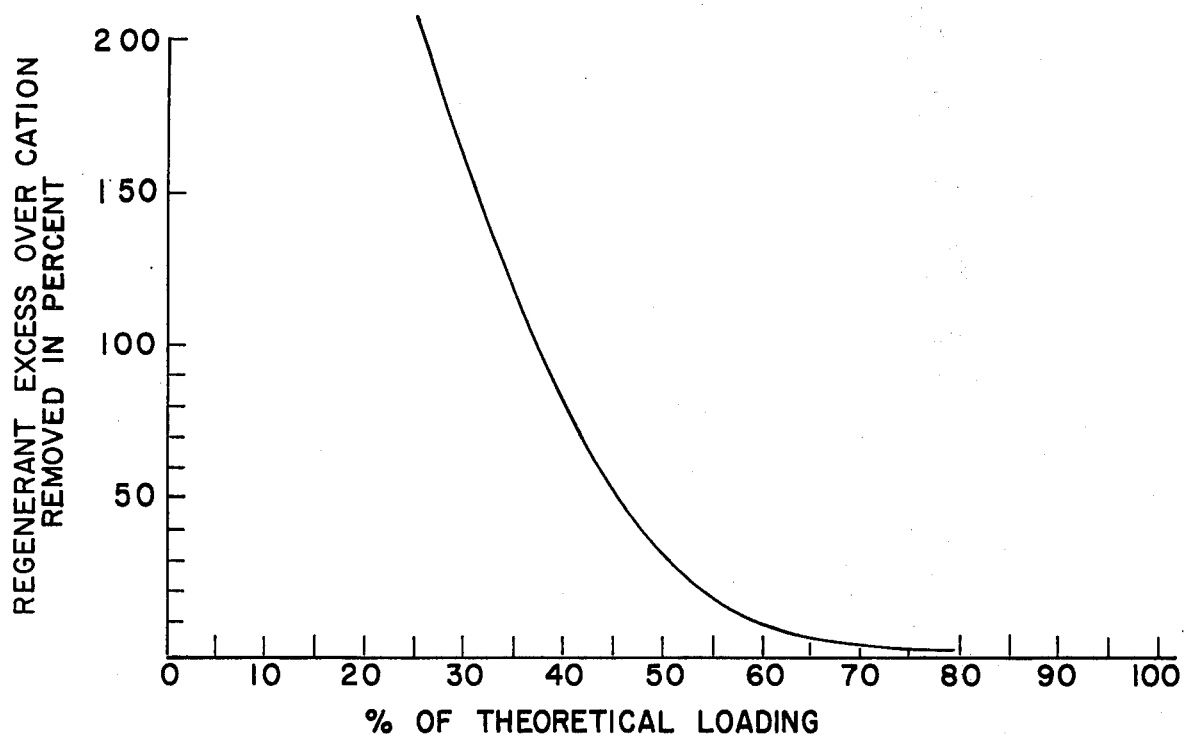
FIG. 2 is a graph illustrating the regeneration excess vs. cation resin loading at the time of regeneration for 100% CC-3 resin generated with MOPA.

The requirements for adequate regeneration of a N-methyl morpholine buffered CC-3 cation resin are contained in FIGS. 1-2. This data was obtained from pilot plant runs utilizing MOPA at 25°C as the regenerant. The data shows the effect of cation loading and excess regenerant on the efficiency or completeness of regeneration. For MOPA complete regeneration with a reasonable excess of acid requires a cation loading of 50% or higher.

As previously discussed, the choice of physical method of separating and recovering the regenerants influences the selection of regenerants. For example, in the distillation process the high temperature exposure of the cation regenerant during the physical separation of the two regenerants requires a high thermal stability and a high chemical stability, viz a viz, the other materials present in the regenerant media for the cation regenerant. Also, the boiling points of the regenerants and the vapor pressure must be considered in the distillation technique. Should separation be made by either solvent extraction or complexation, different physical properties relevant to such techniques and which are readily understood by the artisan must be considered. A more detailed description of particular separation techniques follows.

The removal from the neutralization mixture of one of the regenerants is dependent first on the dissociation of the complex formed between the two regenerants and the formation of an essentially non-dissociated complex with the complexing agent. It is found that when an insoluble complexing agent is employed to form an insoluble complex, this latter complex is little dissociated and hence the reaction to remove the regenerant is driven to an adequate degree of completion. A second requirement for this recovery is that the complex formed for the removal of regenerants must be destroyed by some means such as heat in order to recover the regenerant for use.

Separation of the regenerants at ambient conditions reduces the high temperature exposure of the regenerants and thus minimizes degradative side reactions such as oxidation, ester formation, amide formation, or dimerization which may occur on prolonged heating and which limit the types of regenerants which may be used. Although a complex of either the anion or cation regenerant could be used for the process from a practical standpoint, the anion regenerant such as the organic amines are more easily complexed and can most readily be removed. The properties of the complexing agent have a direct bearing on the efficiency of the process. In order to achieve efficient removal of one of the regenerants, a complexing agent should provide a complex which is essentially undissociated at ambient or low temperature. This is best achieved through the use of an insoluble complexing agent which in turn produces an insoluble complex, thus removing the regenerant from the ionizing medium.

The use of volatile complexable regenerant, on the other hand, aids the recovery of the complexed regenerant for use. Thus, heat can be used to break down the complex after isolation and the volatility permits the removal of the regenerant from the complexing agent. Preferred insoluble complexing agents are transition metal salts of water insoluble cross-linked polyacids. These polyacids are commercially available as cation-exchange resins and include polyacrylates, polymethacrylates, phosphonic acid and sulfuric acid substituted polystyrene based materials. The transition metals suitable for salt formation with these polyacids include copper, cobalt, chromium, iron and nickel, among others. The complexing agents are prepared by dmixing the polyacid with a water soluble salt of the desired transition metal ion under ambient conditions. The insoluble complexing agent forms directly and is separated for use in the spent regenerant recovery process of the invention.

Strong polyacids provide complexes with the transition metal which are not subject to dissociation and therefore could form soluble amine complexes which interfere with the removal of the amine. Preferred acids are strong polyacids, such as Dowex-50, a polysulfuric acid on a polystyrene lattice. An example domonstrating use of an insoluble complexing agent to separate an anion regenerant from its weak dissociable complex with a cation resin follows.

EXAMPLE 1

Twenty-five mil. of water solution containing 5.7% (13.7 milliequivalents) of β-methoxypropionic acid and 3.5% (13.7 milliequivalents) of trimethylamine (TMA) were treated with 20 mil. of Dowex-50 resin (38 miliequivalents), 60% of the acid sites substituted with cupric ions. The resin was stirred for several hours and the supernatant liquid remained colorless. Analysis of the supernatent liquid and the resin after separation showed the resin to contain 4.2% copper and 7.16% trimethylamine. Essentially all of the trimethylamine had been removed from solution as indicated by the following analysis of the supernatant liquid.

$Cu^{++}$     1.3 ppm
TMA     0.1 ppm

Efficient separation of the regenerants by solvent extraction can also be accomplished in accordance with the invention. The separation and removal of one regenerant from the other by extraction of the near stoichiometric adjustment mixture with a non-miscible solvent is also dependent on the dissociation of the complex formed between the regenerants. This dissociation occurs readily between weak acids and weak bases under the higher temperature conditions attained during distillation. However, surprisingly it has also been found that sufficient dissociation also occurs at ambient temperature to permit ready extraction of a single component.

Separation at ambient conditions provides a significant advantage over high temperature conditions in that the degradative side reactions occurring at temperatures above the boiling point of water such as oxidation, ester formation, amide formation, or dimerization which limits the selection of regenerants for higher temperature applications are minimized and hence a wider variety of chemical structures are suitable as regenerants. A second significant advantage is that the organic amine anion regenerant need not be volatile and hence losses due to volatility or the obnoxious odors associated with volatile amines are minimized. The process is alos amenable to continuous operation. Suitable amines are primary, secondary or tertiary amines such as trimethylamine, pyridine, N-methylmorpholine, isopropanolamine, ammonia, N,N-dimethylethylamine. The cation regenerants may be any of those previously recited.

The extractants may be aliphatic, alicyclic, or aromatic hydrocarbons containing 2–12 carbon atoms, such as hexane, heptane cyclohexane, toluene or benzene and halogenated derivatives thereof such as trichloroethylene. Other extractants include aliphatic or aromatic ethers such as diethylether or diphenyl oxide. Although it is possible to extract the cation regenerant, there are more readily available extractants which are good solvents for the amine regenerants and which are non-solvent for the cation regenerants and hence they are preferred in the practice of this embodiment. Examples of practice follow.

EXAMPLE 2

β-methoxypropionic acid (cation resin regenerant) and trimethylamine (an anion resin regenerant) in approximately equimolar quantities in aqueous solution simulating a stoichiometric adjustant mixture, was subjected to extraction with two separate immiscible solvents, hexane and benzene. Extraction was effected by means of shaking equal quantities of aqueous mixture with the extractant in separatory funnel, allowing the two immiscible phase to separate and then analyzing each of the phases for amine and acid regenerants by potentiometric titration with standardized hydrochloric acid solution and then with standardized sodium hydroxide solution. In a like manner a series of three different mixtures of regenerants were continuously extracted with various immiscible extractants using a laboratory liquid/liquid extractor. The apparatus was so designed that spent extractant was continuously distilled to provide fresh extractant which was reused and the non-volatile, unextracted regenerant concentrated in the distillation pot. The results are shown below. Repeated extractions are required to remove the bulk of the amine but the data indicates the feasibility and operability of the process.

solution as the spent anion regenerant. The combined reagents simulating stoichiometric adjustment and the presence of a residual sodium chloride heel from previous runs had the following composition:

TABLE 4

SEPARATION ANION AND CATION EXCHANGE REGENERANTS BY EXTRACTION OF THE ANION REGENERANT
FROM AQUEOUS SOLUTION WITH AN IMMISCIBLE SOLVENT

I. Extraction by Agitation and Phase Separation

| | | | | Analysis, Normality of Regenerants | | | |
|---|---|---|---|---|---|---|---|
| | Cation | Anion | | Water Phase | | Solvent Phase | |
| Solvent | Regenerant | Regenerant | Time | Cation Reg | Anion Reg. | Cation Reg | Anion Reg. |
| Hexane | β-Methoxy- propionic acid | Trimethyl- amine | Initial Final | 0.99 0.99 | 1.05 0.85 | 0.00 0.00 | 0.000 0.201 |
| Benzene | β-Methoxy- propionic acid | Trimethyl- amine | Initial Final | 0.914 0.930* | 1.03 0.96 | 0.00 0.00 | 0.000 0.018 |
| II. Continuous Extraction (Laboratory Liquid Liquid Extractor) | | | | | | | |
| Benzene | β-Methoxy propionic acid | Pyridine | 0 hrs 2.5 hrs 6.0 hrs | 2.00 — 2.86* | 2.00 — 1.18 | 0.00 0.00 — | 0.000 0.758 1.500 |
| Hexane | β-Lactic acid | N-methyl- morpholine | 0 hrs 2.5 hrs | 1.89 — | 1.90 — | 0.00 0.00 | 0.000 0.025 |
| Diethyl ether | α-Lactic acid | Isopropanol- amine | 0 hrs 2.5 hrs | 1.01 — | 0.94 — | 0.00 0.00 | 0.000 0.007 |

*Increase in acid strength due to water removal by benzene.

Total separation cannot be achieved since there will always be a partition of each regenerant between the two media. Furthermore, with respect to the complexation, this requires the addition, separation and recovery of another chemical to the process which adds additional cost and complexity. For these reasons, the distillation technique is preferred as the method of regenerant separation and recovery. All that is necessary is that one of the regenerants have a significantly lower boiling point than the other, suitably being separated by at least 10°F, preferably by at least 25°F. In practice it is found that amines with lower boiling points are more readily available than low boiling acids used for regenerating the cation. Hence, in most instances a low boiling amine would be used in combination with the higher boiling cation resin regenerant, although the reverse, that is the use of a low boiling cation resin regenerant with a high boiling amine, will work equally as well. The process may be carried out in a variety of ways dependent upon the resins, regenerants and mineral salts to be precipitated. For example, if excess process water is removed prior to bringing the regenerant streams together as generally indicated in FIG. 1, the desired salt precipitation will occur during the first step of stoichiometric combination of the two streams and the precipitated salts may be removed at this stage of the process.

However, on the other hand, when excess water is removed after the separation of the lower boiling amine regenerant then salt precipitation will occur when the composition of the remaining cation regenerant is being concentrated.

Some examples of practice follow.

EXAMPLE 3

In this experiment sodium lactate (boiling point lactic acid = 122°C at 4mm Hg pressure) was used as the spent cation regenerant and N, N-dimethylethylamine hydrochloride (boiling point N,N-dimethylethylamine = 37°C at 760mm Hg pressure) in methanol-water solution as the spent anion regenerant. The combined reagents simulating stoichiometric adjustment and the presence of a residual sodium chloride heel from previous runs had the following composition:

| Compound | Wt, g | Moles |
|---|---|---|
| N,N-Dimethylethylamine | 13.2 | 0.18 |
| Lactic Acid | 16.0 | 0.18 |
| Methanol | 70.0 | |
| Water | 26.0 | |

The above solution was charged to the distillation pot of a 2 ft packed distillation column and the amine removed by distillation using a 10/1 reflux ratio. Initially amine in a predominance of methanol was removed and finally amine and water. Analysis of the distillate and pot for amine by potentiometric titration after six hours showed 48% of the amine to have been removed in the distillate. Analysis of the pot and distillate for lactic acid accounted for all of the lactic acid and showed it to have remained in the distillation pot.

Separation of the amine from the ligand can be accomplished as previously indicated either by a phase separation technique or preferably by distillation. The ease of separation in phase separation is dependent upon the relative partition coefficients, and requires that the amine regenerant be very weakly basic and the cation regenerant be very weakly acidic so that a high degree of disassociation and a maximum rate of hydrolysis to the free state is achieved.

EXAMPLE 4

A 750 ml. volume of aqueous cation regenerant solution combined with water wash containing 0.41 mols of sodium lactate and 0.08 mols of free lactic acid was concentrated by distillation of the water in a simple single plate still. The solution was concentrated to 114 ml. and then rediluted to 150 ml. with deionized water and analyzed for sodium lactate and free lactic acid by titration with hydrochloric acid followed by back titration with sodium hydroxide. The analytical results showed 0.41 mols of sodium lactate and 0.15 mols free lactic acid. The increase in lactic acid was attributed to hydrolysis of lactide impurity in the starting regenerant solution.

Referring again to the preferred distillation technique for separating a more volatile amine anion resin regenerant from a weakly acidic carboxylic acid cation resin regenerant, the separation process can be depicted according to the following formula:

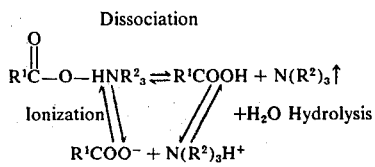

where $R^1COOH$ is the cation resin regenerant and $N(R^2)_3$ is the anion resin regenerant.

The amine carboxylate complex is a loosely bound compound which is partly associated and partly ionized. The amine and acid regenerant should have narrow boiling points separated by at least 10°F in order to permit effective separation. The lower boiling regenerant must have sufficient volatility so that it can be readily removed from the complex containing mixture while the higher boiling regenerant should be essentially non-volatile or have very low volatility so that it does not carry over and contaminate the lower boiling regenerant. Some volatility and carry-over can be suffered. The carried-over regenerant can be removed in a secondary distillation column.

Though separation need not proceed to completion, it is desirable to recover at least 70% of the amine to provide effective regeneration of the anion resin column. The cation regenerant will then contain 70% of the free acid and about 30% undissociated, loosely bound compound. Less excess regenerant and less energy input is required as the degree of separation of the compound is increased.

The effect of loading level on the regeneration requirements for cation exchange resins such as Duolite CC-3 resins loaded with calcium utilizing a MOPA regenerant are presented in the following table.

lactate complex indicated that for the selected regenerants 70% amine removal appears to be an upper limit. Practical operation would indicate removal on the order of 40%. A method of overcoming this difficulty has been successfully tested. This constitutes maintaining a 25% sodium heel on the cation regenerant. Such an imbalance results in excellent amine separation. At the same time sodium is the residue which is left on the cation column. Although this reduces the efficiency of the cation column, the presence of sodium would not contaminate the product water nor would this cause a serious loss of regenerant. Regeneration of a sodium loaded cation column with β-lactic acid (100% stoichiometric as excess lactate ion) resulted in a 92.1% removal of sodium ion with 100% recovery of the β-lactate moiety.

The above technique of using an excess of sodium or other metal ion to reduce the amine residue is limited by the fact that the amine deposits on the resin, because it moves down the column more slowly. Hence, regardless of the degree of imbalance, some residue of amine will remain due to this difference in rate of travel. Even adding the metal cation regenerant incrementally does not solve the problem, because of the presence of a small amount of amine contaminant in the regenerant itself. Thus, one could only tend to go toward reaching a progressively smaller amine residue without actual achievement of complete removal. Thus recycling will not achieve the desired result. However, a secondary treatment or post introduction on the toe of the resin with an inorganic metal salt solution (free of contaminants) will act to displace completely the amine heel on the resin. Such post treatment metal salt can have its metal ion the same or different from that present in the cation regenerant. The negative ion so long as it does not form complexes or insoluble products can be any negative ion, inorganic or low molecu-

TABLE 5

EFFECT OF LOADING LEVEL ON THE REGENERATION REQUIREMENTS
FOR CATION EXCHANGE RESINS.
(DUOLITE CC-3 RESIN, LOADED WITH CALCIUM, MOPA REGENERANT)

| LOADING % OF THEORETICAL | CONC. REGEN. SOLUTION, N | STOICHIOMETRY OF REGEN. CHANGE, % OF CA$^{++}$ LOAD | FLOW RATE, ml/MIN. | REGENERATION YIELD, % |
|---|---|---|---|---|
| 70 | 1 | 300 (1) | 1 | 94 |
| 40.5 | 0.5 | 200 (2) | 1.5 | 68 |
| 38 | 1 | 200 (2) | 0.5 – 1 | 66 |
| 28.5 | 1 | 610 (1) | 1 | 100 |

(1) Profile technique of regeneration.
(2) Standard regeneration with wash.
MOPA = β-methoxypropionic acid This data shows that very high levels of regeneration at 50% stoichiometric excess are achieved when a relatively high sodium chloride heel (7.6%) is present as a contaminant. However, when high residues of TMA are present in the regeneration stream, 40% or more significant quantities of TMA remain on the column as a substituent ion. Such a residue would appear later as a contaminant in the product water and result in a significant loss of regenerant. Laboratory and pilot plant scale tests of the separation of TMA from the TMA lar weight organic such as formate. When this technique of post treatment is employed, the use of an imbalanced system is not required, but may be utilized. Experimentation has shown that post treatment salt concentrations of the order of 500 to 10000 ppm and in stoichiometric excess over the amount of amine residue should be employed to give the best results.

Summary of the pilot plant tests of a TMA-β-lactate system on continuous runs is shown in the following table.

TABLE 6

SUMMARY OF PILOT PLANT TESTS
TMA - β-Lactate System
(Continous Runs)

| Feed Composition | | Distillate Composition | Reboiler Composition | | % Dissociate |
|---|---|---|---|---|---|
| Lactate | Free Amine | Free Amine | Lactate | Free Acid | |
| FEEDING NEUT. REGEN. SOLUTION TO DISTILLATION COLUMN | | | | | |
| 0.28N | .05N | 1.57N | 0.45N | 0.12N | 25.6 |
| 2.5 wt% | 0.3 wt% | 9.55 wt% | 4.06 wt% | 1.04 wt% | |
| FEEDING NEUT. REGEN. SOLUTION TO EVAPORATOR | | | | | |
| 0.28N | .05N | 0.33N | 4.8N | 2.5N | 52.1 |
| 2.5 wt% | 0.3 wt% | 2.0 wt% | 39 wt% | 20 wt% | |
| FEEDING CONCENTRATED NEUT. REGEN. SOLUTION TO EVAPORATOR | | | | | |
| 1.36N | 0.12N | 0.7N | 4.5N | 2.4N | 63.3 |
| 12 wt% | 0.7 wt% | 4.1 wt% | 37 wt% | 20 wt% | |
| FEEDING AMINE SOLUTION TO EVAP. AS CK ON EQUILIBRIUM | | | | | |
| 0.01N | 0.7N | 0.7N | 7.5N | 5.3N | 70.7 |
| Trace | 4.0 wt% | 4.0 wt% | 60 wt% | 42 wt% | |

A list of the pertinent physical properties of ingredients useful in the system of the invention are provided in the following table.

TABLE 7

PHYSICAL PROPERTY DATA

| Description | M. W. | $\rho 20°C$ g/cc | $\mu 20°C$ g/cm-sec | at in B.P. °C | M. P. °C |
|---|---|---|---|---|---|
| Methanol (MeOH) | 32.04 | 0.7914 | — | 65.0 | −93.9 |
| β-methoxypropanoic acid (MOPA) | 104.10 | 1.105 | 8.7 | 102 at 10mm Hg | liq. |
| N-methylmorpholine | 101.15 | 0.9051 | | 115 | liq. |
| Sodium Methoxypropanate | 126.08 | — | Solid | — | — |
| Trimethylamine (TMA) | 59.11 | 0.662 | ~0.3 | 2.9 | −117.2 |
| TMA.MOPA | 163.21 | — | Solid | — | — |
| Spent Anion Regen. (TMA sol'n) | — | 1.003 | 0.92 | — | — |
| Spent Cation Regen. (recycled MOPA sol'n) | — | 1.043 | — | — | — |
| Anion Regen. (2.15N TMA) | — | 0.963 | 1.86 | — | — |
| Mixed Spent Regenerants | — | 1.020 | — | — | — |
| Recovery MOPA sol'n) (5.5N) | — | 1.139 | 8.4 | — | — |
| Cation Regenerant (2N MOPA) | — | 1.033 | — | — | — |
| Dimethylethanolamine | 89.14 | 0.887 | — | 133.5 | — |
| β-Lactic Acid | 90.08 | 1.449 | — | Decomposes | — |
| Recovered MOPA sol'n (2.5N) | — | 1.056 | — | — | — |

A pilot plant capable of processing 1,000 gallons per day of waste water was operated as follows. The ion-exchange system consisted of a series of cation-anion resin bed sets identified as the carousel fixed beds buffered system as disclosed in application Ser. No. 476,835, filed June 6, 1974. The resins were CC-3 cation resin, IRA-68 anion resin and N-methylmorpholine and were utilized as buffer at 50% of theoretical cation capacity; trimethylamine (2N) was utilized as anion regenerant; and β-methoxyproprionic acid (2N) was utilized as cation regenerant.

The resin columns were all 6 inches inside diameter, the cation resin columns were loaded to a 27-inch bed depth (fully regenerated) with 0.442 cubic foot of CC-3 resin (54 g-eq theoretical capacity); the anion resins were loaded to a 54-inch bed depth (fully regenerated) with 0.884 cubic foot of IRA-68 resin (38.5 g-eq theoretical capacity). Eight columns were provided in 5 sets. The loading capacity of the lead anion resin column would be reached between 19 and about 29 hours with the system reducing 500 ppm in NaCl feed to water containing below 2 ppm NaCl with the column loaded to a level of 40%. Highest purity water is achieved when the ion beds have been essentially 100% regenerated.

The anion resin is completely regenerated by using a 2N trimethylamine solution containing a 35% excess of regenerant; excess beyond a stoichiometric amount of anion loaded on the resin. The recycled cation regenerant composition is considerably more complex. The composition used successfully for regeneration is: 2.5N MOPA acid, 0.8N TMA-MOPA acid salt, 0.4N sodium chloride, and 0.15N of unidentified ionized chlorides or chlorinated compounds. When the sodium chloride concentration approaches 0.8N and the TMA-MOPA nears 1.7N, the regeneration efficiency drops below 100% sodium removal and cation bed performance suffers.

The data demonstrates that with the use of TMA and MOPA as the regenerants, dissociation approaching 80% is regularly obtained at evaporator temperatures of 250°F. At current ion-exchange loadings of 35% of theory, the regenerant recovery load is 0.1 gallon spent regenerant for every gallon of water at 1,000 ppm NaCl process. By increasing the ion-exchange loading to 70%, this load will be reduced almost inversely to 0.05 gallons regenerant per gallon process water at 1,000 ppm NaCl. This reduction results since the wash water represents the bulk of the spent regenerant volume and remains essentially constant regardless of ion bed loading. In addition, the cation regenerant volume remains constant since less excess regenerant is required as loading increases.

In summary, it is seen that the use of the alkoxy or hydroxy substituted alkanoic acids of this invention as cation regenerants represents a step forward from the prior use of chelating agents such as beta diketones as a cation regenerant in water demineralization systems. The benefits to be obtained over the use of such diketones lies in the higher thermal and chemical stability without loss of water solubility of such acid regenerants. These facts allow the practicioner to separate and recover not only the cation regenerant but also due to physical property differences, the anion regenerants, since the two can be separated from each other by physical means as has been shown here, without high loss factors for either regenerant, most particularly in a distillation regenerant separation technique.

If one attempts to utilize other acids such as aliphatic hydrocarbon acids, e.g., acetic, proprionic, etc., poor results are obtained in attempting to separate the cationic and anion regenerants from each other. Thus it is seen that the total process must be considered. While the aliphatic acids may give suitable individual results for regeneration of the separate streams, when one wants to recover each regenerant for use from the neutralization mixture as for instance by the technique of copending application of DePree filed concurrently herewith Ser. No. 476,835, difficulties arise such as for distillation, — slight differential between boiling point of $H_2O$ and the acid, and the formation of azeotropes with water; in solvent extraction, much higher solubilities in common solvents with resultant poor partition coefficients.

It is to be realized that only preferred embodiments of the invention have been described and that numerous substitutions, alterations and modifications may be made without departing from the spirit and scope of this invention as defined in the following claims.

What is claimed is:

1. A method of recovering and recycling spent ion-exchange regenerants comprising the steps of:
   1. passing through a first, separate bed of spent, weakly basic, anion exchange resin containing bound inorganic anion, X, a weak organic base anion regenerant, $R_a$, to regenerate said resin and to form a first effluent stream containing spent anion regenerant of the formula, $R_aX$;
   2. passing through a second, separate bed of spent, weakly acidic cation exchange resin containing bound inorganic cation, M, a cation regenerant, $R_c$, selected from an hydroxy or alkoxy substituted alkanoic acid to regenate said resin and to form a second effluent stream containing spent cation regenerant of the formula, $MR_c$;
   3. combining said first stream containing spent anion regenerant, $R_aX$, with said second stream containing spent cation regenerant, $MR_c$, to form a mixture containing a strongly dissociated, ionizable complex, $R_cR_a$, and reconstituted inorganic salt, MX;
   4. dissociating the complex to free $R_c$ or $R_a$ regenerant;
   5. separating one of the regenerants from the mixture and recycling it to one of said beds; and
   6. separating the remaining regenerant from the mixture and recycling it to the other of said beds.

2. A method according to claim 1 in which the hydroxy or alkoxy substituted alkanoic acid is selected from compounds of the formula:

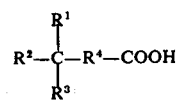

where $R^1$, $R^2$ and $R^3$ are selected from —H; —OH, —$(CH_2)_n$ $CH_3$, —$O(CH_2)_nCH_2R^5$, —$O[(CH_2)_qO]_mCH_2R^5$ where $n$ is an integer from 1–5, $m$ is an integer from 1–3, $q$ is an integer from 1–3, $R^5$ is —H or —OH, provided at least one of $R^1$, $R^2$ or $R^3$ contains at least one —C—O—C— or —COH moiety; and $R^4$ is a divalent aliphatic hydrocarbon bridge containing 1–4 carbon atoms.

3. A method according to claim 2 in which $R^1$ is —H, $R^2$ is selected from alkyl or alkoxyalkyl, and $R^3$ is a hydroxy or alkoxy group.

4. A method according to claim 3 in which the cation regenerant is selected from α-hydroxy alkanoic acids of from 2–6 carbon atom chain length, β-hydroxy alkanoic acids of from 2–6 carbon atom chain length and methyl, ethyl and propyl ethers thereof.

5. A method according to claim 4 in which the cation regenerant is selected from α-lactic acid, β-lactic acid, β-methoxy propionic acid and 4,7-dioxacaprylic acid.

6. A method according to claim 2 further including the step of stoichiometrically adjusting the amount of $MR_c$ combined with $R_aX$ such that MX is formed.

7. A method according to claim 6 further including the step of removing said salt from the mixture.

8. A method according to claim 7 in which the concentration of the salt is increased until it precipitates from the mixture.

9. A method according to claim 2 further including the step of adjusting the concentration of the separated regenerants before recycling them to regenerate spent ion-exchange resin beds.

10. A method according to claim 2 in which the pK of the regenerants is between 5 and 7.

11. A method according to claim 10 in which the anion regenerant is a weak organic base having a pK magnitude at least 2 more basic than the anion resin.

12. A method according to claim 11 in which the anion regenerant is an amine having a molecular weight below 500.

13. A method according to claim 2 in which separation is accomplished by distilling one of said regenerants from the mixture and one of said regenerants is substantially more volatile than the other.

14. A method according to claim 13 in which the boiling point of the more volatile regenerant is at least 10°F less than the other regenerant.

15. A method according to claim 14 in which the more volatile regenerant is an amine anion resin regenerant and at least 80% of the amine is separated and recovered.

* * * * *